United States Patent
Van Brocklin et al.

(10) Patent No.: US 6,872,437 B2
(45) Date of Patent: Mar. 29, 2005

(54) OPTICAL DISC WITH PSEUDORANDOM SERIES OF MARKS ON OPTICAL DISC TRACK

(75) Inventors: Andrew L. Van Brocklin, Corvallis, OR (US); Andrew Koll, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 88 days.

(21) Appl. No.: 10/622,986

(22) Filed: Jul. 18, 2003

(65) Prior Publication Data

US 2005/0013964 A1 Jan. 20, 2005

(51) Int. Cl.[7] .................................................. B32B 3/02
(52) U.S. Cl. ..................... 428/64.1; 428/64.4; 428/64.8; 430/270.14; 369/275.4
(58) Field of Search .............................. 428/64.1, 64.4, 428/64.8, 913; 430/270.11, 270.14, 945; 369/275.4

(56) References Cited

U.S. PATENT DOCUMENTS

| | | | | |
|---|---|---|---|---|
| 5,573,831 A | * | 11/1996 | Suzuki et al. ............... | 428/64.1 |
| 5,702,792 A | * | 12/1997 | Iida et al. ................... | 428/64.1 |
| 5,820,961 A | * | 10/1998 | Maruyama et al. ......... | 428/64.1 |
| 5,869,163 A | * | 2/1999 | Smith et al. ................ | 428/64.1 |
| 6,083,598 A | * | 7/2000 | Ohkubo et al. ............. | 428/64.1 |
| 6,168,841 B1 | * | 1/2001 | Chen ......................... | 428/40.1 |
| 6,212,285 B1 | | 4/2001 | Bender et al. | |
| 6,325,420 B1 | | 12/2001 | Zhang et al. | |
| 6,343,138 B1 | | 1/2002 | Rhoads | |
| 6,354,630 B1 | | 3/2002 | Zhang et al. | |
| 6,514,588 B2 | * | 2/2003 | Rosenbaum et al. ........ | 428/40.1 |
| 2004/0004922 A1 | * | 1/2004 | Selinfreund et al. ..... | 369/53.21 |
| 2004/0110088 A1 | * | 6/2004 | Vig et al. .............. | 430/270.15 |
| 2004/0114501 A1 | * | 6/2004 | Kondo et al. ............ | 369/275.4 |

FOREIGN PATENT DOCUMENTS

JP   2002-203321   7/2002

* cited by examiner

Primary Examiner—Elizabeth Mulvaney

(57) ABSTRACT

An optical disc of an embodiment of the invention is disclosed that includes an optically writable label side on which marks are optically writable. The optical disc includes a plurality of tracks on the optically writable label side. Each track has written thereto a repeating pseudorandom series of marks.

48 Claims, 12 Drawing Sheets

OPTICAL DISC WITH PSEUDORANDOM SERIES OF MARKS ON OPTICAL DISC TRACK

BACKGROUND OF THE INVENTION

Computer users employ writable and rewritable optical discs for a variety of different purposes. They may save programs or data to the discs, for archival or distribution purposes. In the case of CD-type discs, users may make music CD's that can be played in audio CD players, or save music data files to the CD's, such as MP3 files, that can be played in special-purpose CD players. In the case of DVD-type discs, users have greater storage capacity available to them than with CD-type discs, and may be able to make video DVD's that can be played in stand-alone DVD players.

Many types of optical discs include a data side and a label side. The data side is where the data is written to, whereas the label side allows the user to label the optical disc. Unfortunately, labeling can be an unprofessional, laborious, and/or expensive process. Markers can be used to write on optical discs, but the results are decidedly unprofessional looking. Special pre-cut labels that can be printed on with inkjet or other types of printers can also be used. However, this is a laborious process: the labels must be carefully aligned on the discs, and so on. Special-purpose printers that print directly on the discs can be used, but such printers are fairly expensive.

In the patent application entitled "Integrated CD/DVD Recording and Label", filed on Oct. 11, 2001, and assigned Ser. No. 09/976,877, a solution to these difficulties is described, in which a laser is used to label optical discs. Such an optical disc may have an optically writable label surface, or side, and an optically writable data surface, or side. For optimal optical labeling of such an optical disc, the tracks of the label surface of the disc are desirably identifiable by a mass storage device in which the optical disc has been inserted.

SUMMARY OF THE INVENTION

An optical disc of an embodiment of the invention includes an optically writable label side on which marks are optically writable. The optical disc includes a plurality of tracks; on the optically writable label side. Each track has written thereto a repeating pseudorandom series of marks.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Optical Disc

Figure 1:
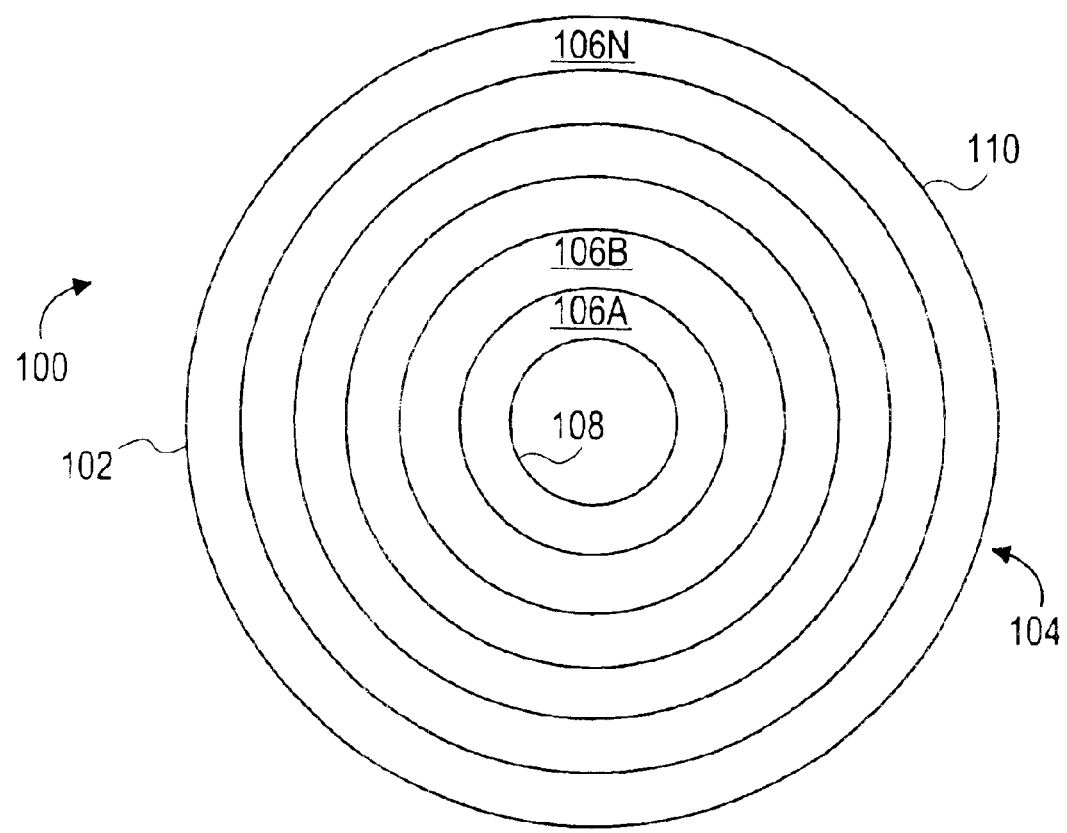
FIG. 1 is a diagram of an optical disc, according to an embodiment of the invention.

FIG. 1 shows an optical disc 100, according to an embodiment of the invention. The optical disc 100 may be a compact disc (CD), a digital versatile disc (DVD), or another type of optical disc. The optical disc 100 preferably has an optically writable label surface 102, and an optically writable data surface 104. An example of the optically writable label surface 102 is particularly disclosed in the patent application entitled "Integrated CD/DVD Recording and Label", filed on Oct. 11, 2001, and assigned Ser. No. 09/976,877. The label surface 102 is primarily intended for human-readable marks representing an image to be written thereto, whereas the data surface 104 is primarily intended for machine-readable marks representing data to be written thereto.

The label surface 102 has a number of tracks 106A, 106B, . . . , 106N, collectively referred to as the tracks 106, on which marks are optically writable. The tracks 106 extend from an inner diameter 108 to an outer diameter 110 of the optical disc 100. Whereas the tracks 106 are depicted in FIG. 1 as concentric rings, in other embodiments of the invention they may be parts of a spiral extending from the inner diameter 108 to the outer diameter 110. There may be hundreds or more of the tracks 106. The tracks 106 may be logically numbered from the first track 106A at the inner diameter 108 of the optical disc 100, to the last track 106N at the outer diameter 110 of the disc 100. Preferably, each track has a width that is approximately as wide as the minimum dot size of marks that can be optically written to the track.

Figure 2:
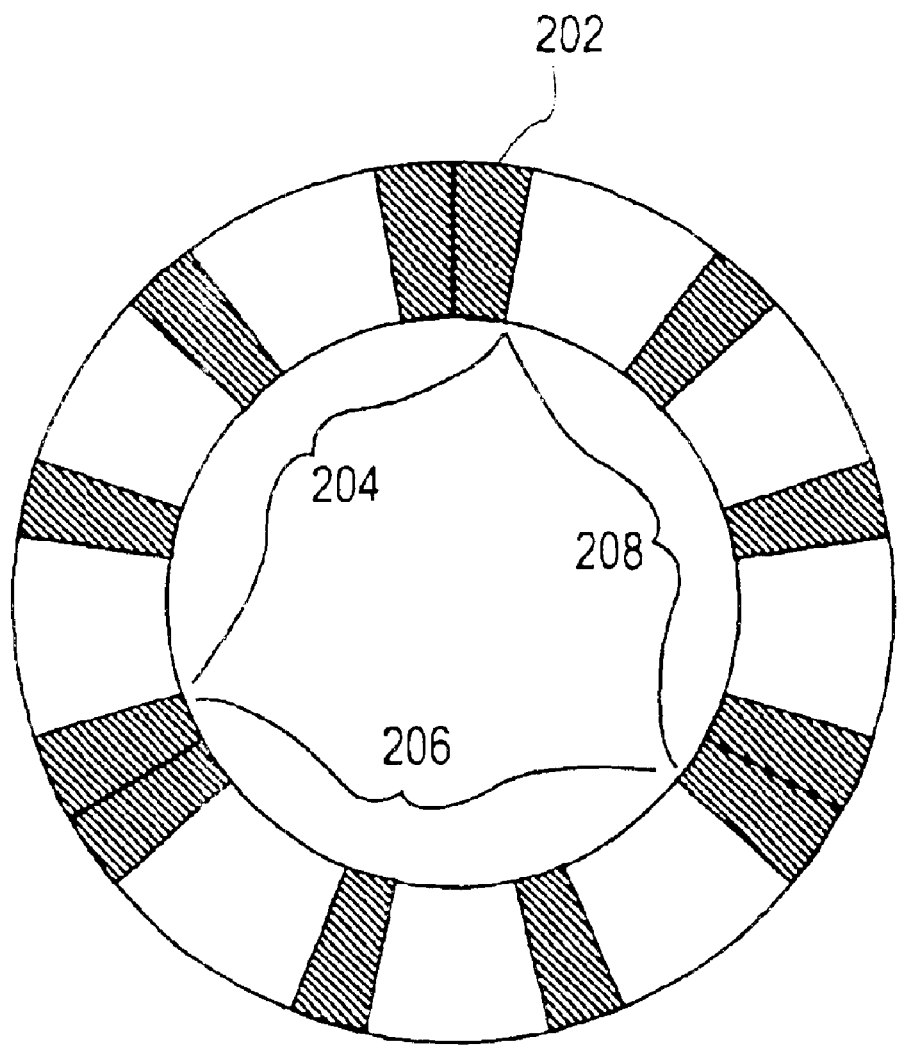
FIG. 2 is a diagram of a track of the optical disc of FIG. 1, in which a repeating pseudorandom series of marks has been written thereon, at least one of in which a number of the track has been encoded, according to an embodiment of the invention.

FIG. 2 shows a rudimentary track 202, according to an embodiment of the invention. The track 202 is representative of one of the tracks 106 of the optical disc 100 of FIG. 1. The rudimentary track 202 includes a pseudorandom series of marks 204, which is repeated as the pseudorandom series of marks 206 and as the pseudorandom series of marks 208 around the track 202. At least one of the pseudorandom series 204, 206, and 208 each encode the number of the track 202. For example, if the track 202 is the first track of the optically writable label side of an optical disc, a track number of one may be encoded within at least one of the pseudorandom series 204, 206, and 208. Although the series 204 is depicted in FIG. 2 as being repeated twice, as the series 206 and 208, over the track 202, in actuality it is likely to be repeated hundreds of times over the track 202. That is, the size of the marks within the pseudorandom series 204, 206, 208 has been exaggerated for illustrative clarity.

The number of the track 202 can be encoded within at least one of the pseudorandom series of marks 204, 206, and 208 in a number of ways. In one approach, the number of the track 202 is encoded within at least one of the pseudorandom series of marks 204, 206, and 208 in accordance with a spread spectrum coding approach, as is specifically described in a subsequent section of the detailed description. The series of marks 204, 206, and 208 are pseudorandom in one embodiment in that to the casual observer they appear random, and do not appear to contain any useful information. The pseudorandom nature of the series 204, 206, and 208 also aids in their being less noticeable to an observer. Humans, for instance, are more able to discern and notice regular and repeating marks than they are pseudorandom marks, which may appear as background noise on the optical disc to the user. That is, users most likely will discern a slight mottling on the optical disc, or a random texture on the disc.

In one embodiment, none of the pseudorandom series of marks 204, 206, and 208 has the number of the track 202 encoded therein. In this embodiment, angular positioning information is still available, where at least one of the series of marks 204, 206, and 208 is different than the other series. For instance, one of the series 204, 206, and 208 may be incomplete as compared to the other series, and thus serves as an index series of marks. Detecting this index series of marks enables an initial position around the track 202 to be located, where angular positioning relative to the index series of marks is determined by reading the other pseudorandom series of marks.

The pseudorandom series of marks 204, 206, and 208 may be distinguished from other optically written marks on the optically writable label side of an optical disc in a number of ways. For instance, the pseudorandom series of marks 204, 206, and 208 may be written with the same dye as that with which other marks are optically written on the label side, but at a greater or a lesser amount for each mark of the pseudorandom series 204, 206, and 208, as compared to amount used for optically writing the other marks. That is, the amount of dye used for writing the marks of the pseudorandom series 204, 206, and 208 is particular to optical track writing. This results in the reflectivity of the marks of the pseudorandom series 204, 206, and 208 being different than the reflectivity of other marks that are optically written on the label side.

Alternatively, the pseudorandom series of marks 204, 206, and 208 may be written using a dye that is different than the dye with which other marks are optically written on the label, side of the disc. That is, the dye used in optically writing the marks of the pseudorandom series 204, 206, and 208 is particular to optical track writing. In either of these approaches, a mass storage device that is able to optically read marks can distinguish between the marks of the pseudorandom series 204, 206, and 208 in which the track numbers are encoded from other optically written marks.

The encoding of track numbers within pseudorandom series of marks that are optically written on the label side of an optical disc enables a mass storage device that is able to optically read the marks to determine from which track it is currently reading marks. Furthermore, the mass storage device may be able to count each pseudorandom series of a track as it passes over them, enabling the device to determine where it is within a current track. Thus, the repeating pseudorandom series of marks on the tracks of an optical disc enable the mass storage device to more accurately discern its angular position on the optical disc. The location of the first instance of encoded track information can act as an index mark, indicating that the first cycle of the pseudorandom series of marks is the first of a sequence around the track. As a result, counting repetitions of the series of marks around a track yields the precise angular position on the disc.

Figure 3A:
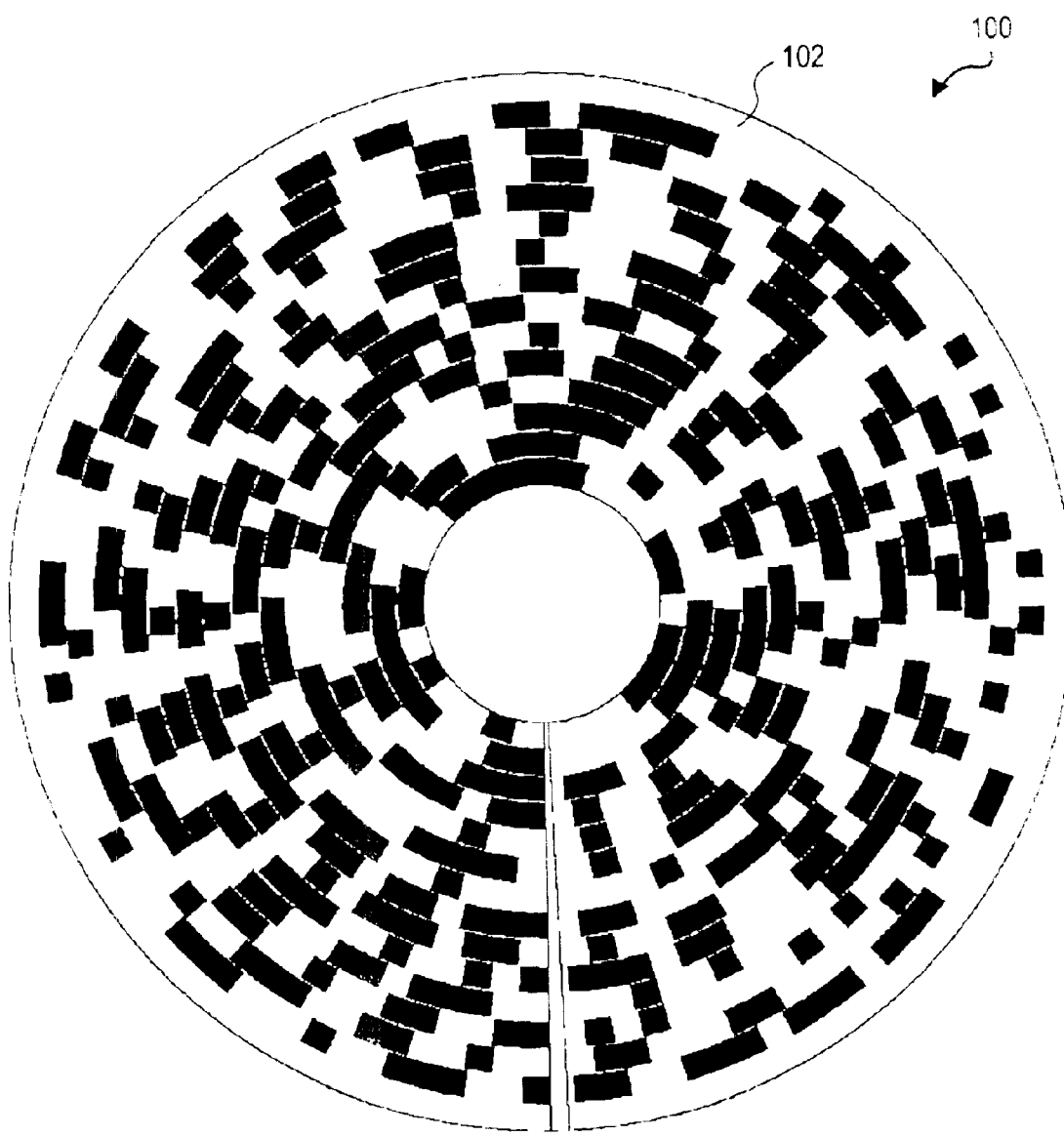
FIGS. 3A, 3B, and 3C are diagrams of example optical discs in which repeating pseudorandom series of marks have been written thereon, at least one of in which the numbers of the tracks have been encoded, according to varying embodiments of the invention.
Figure 3B:
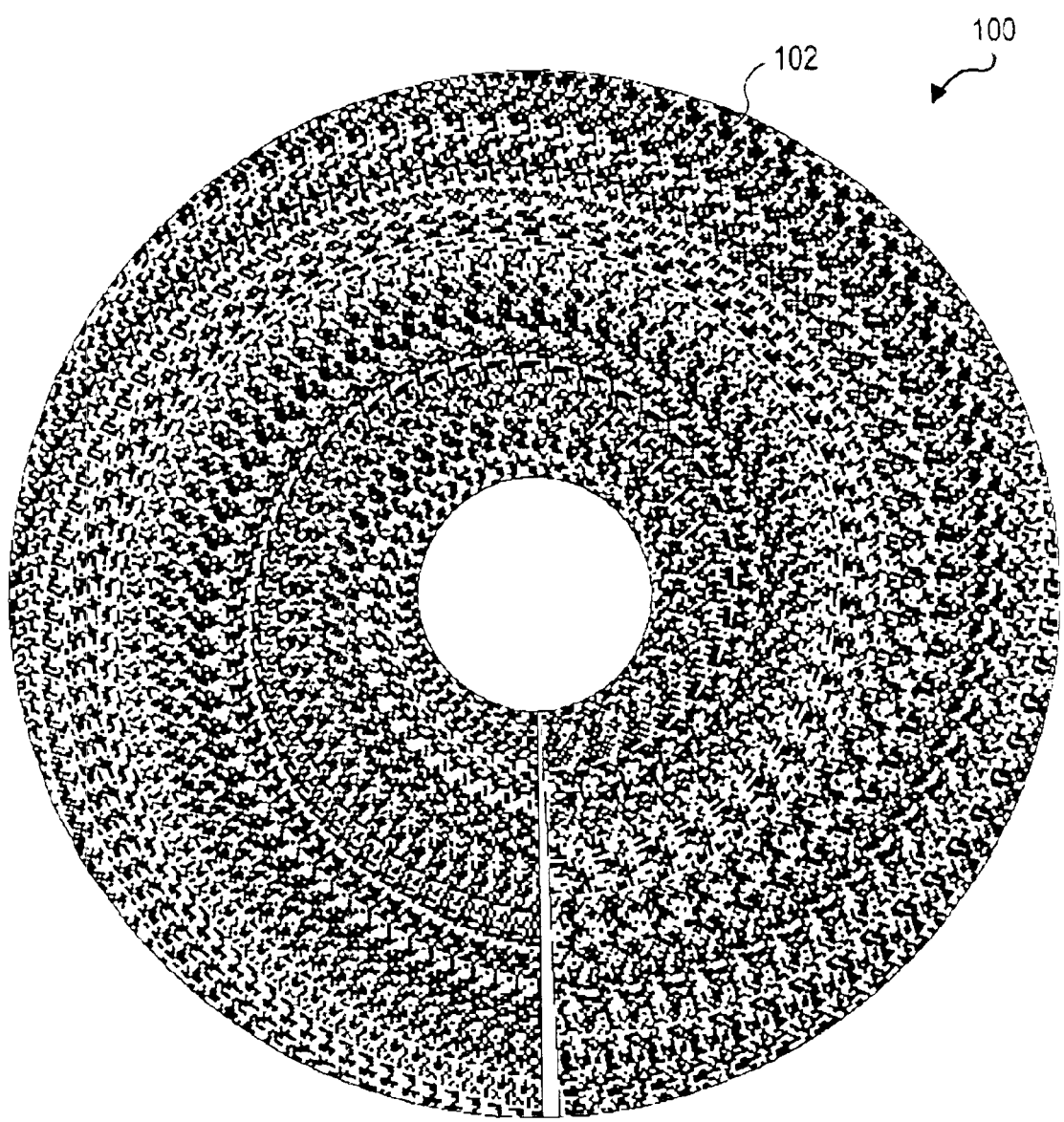
Figure 3C:
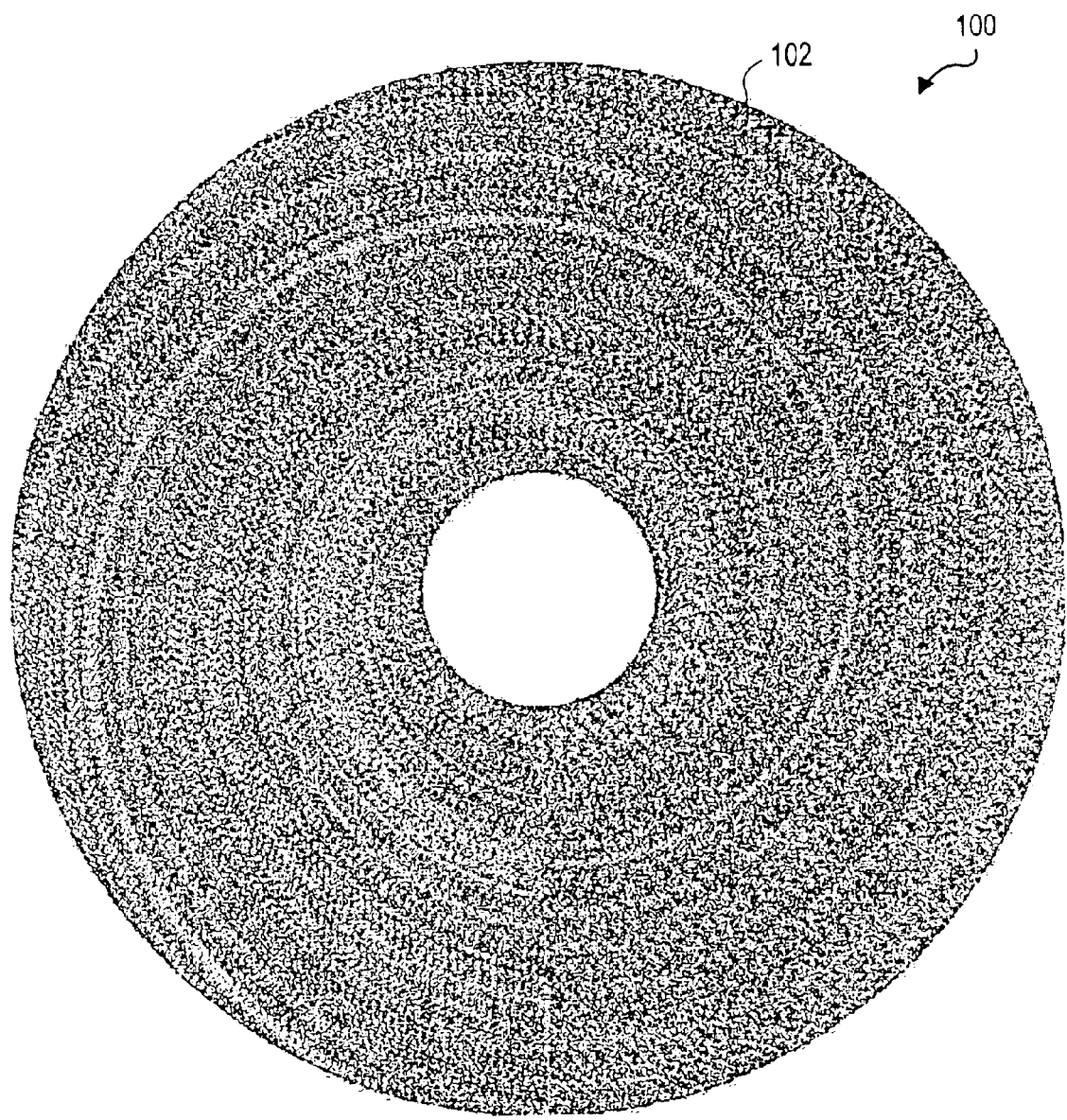

FIGS. 3A, 3B, and 3C show illustrative examples of the encoding of track numbers within at least one of the pseudorandom series of marks optically written to the tracks on the optically writable label surface 102 of the optical disc 100, according to varying embodiments of the invention. The examples depicted in FIGS. 3A, 3B, and 3C are specific with respect to an analog encoding approach, as is described in a later section of the detailed description. The tracks 106 are not explicitly depicted in FIGS. 3A, 3B, and 3C. In FIG. 3A, the pseudorandom series of marks have been exaggerated in size for illustrative clarity. In FIG. 3B, the pseudorandom series of marks are shown more akin to their actual size, but their darkness level has been exaggerated for illustrative clarity. Finally, in FIG. 3C, the pseudorandom series of marks are shown more akin to their actual size, and more akin to their actual darkness level.

Encoding Track Number within Pseudorandom Code

Figure 4:
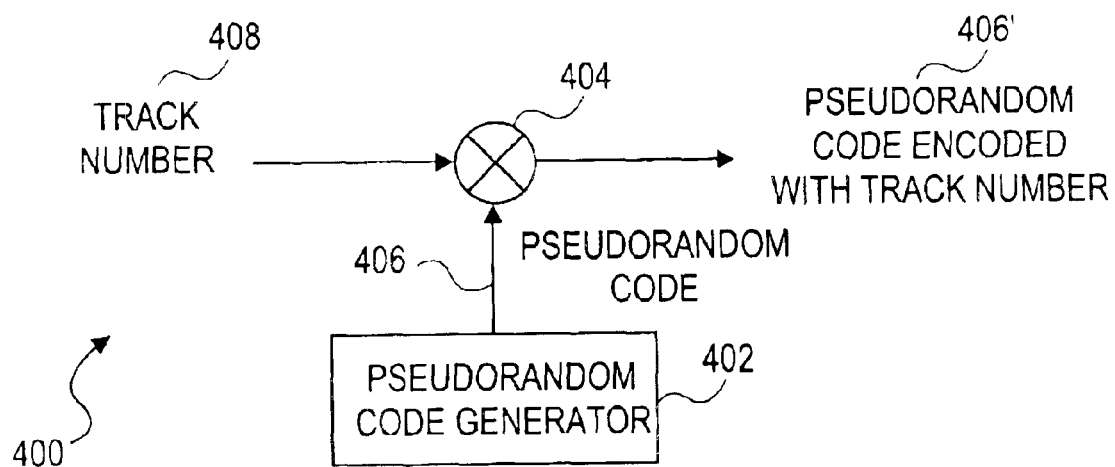
FIG. 4 is a block diagram of a spread spectrum encoding approach, according to an embodiment of the invention, where the track number is specifically encoded within a pseudorandom code, and where the bit rate of the track number is less than the bit rate of the pseudorandom code.

FIG. 4 shows an encoding approach 400 for encoding a track number 408 within a pseudorandom code 406, according to an embodiment of the invention where the track number is specifically encoded within a pseudorandom code, and where the bit rate of the track number is less than the bit rate of the pseudorandom code. A pseudorandom code generator 402 generates the pseudorandom code 406 on a bit-by-bit basis. The pseudorandom code 406 is preferably a maximal spread spectrum code, such that the encoding approach 400 is consistent with a spread spectrum coding approach. The track number 408 and the pseudorandom code 406 are fed into a modulator 404 on a bit-by-bit basis. The modulator 404 modulates, or multiples, the track number 408 and the pseudorandom code 406, resulting in the pseudorandom code 410 that is encoded with the track number 408. Each of the code generator 402 and the modulator 404 may be implemented in software, hardware, or a combination of software and hardware.

Figure 5:
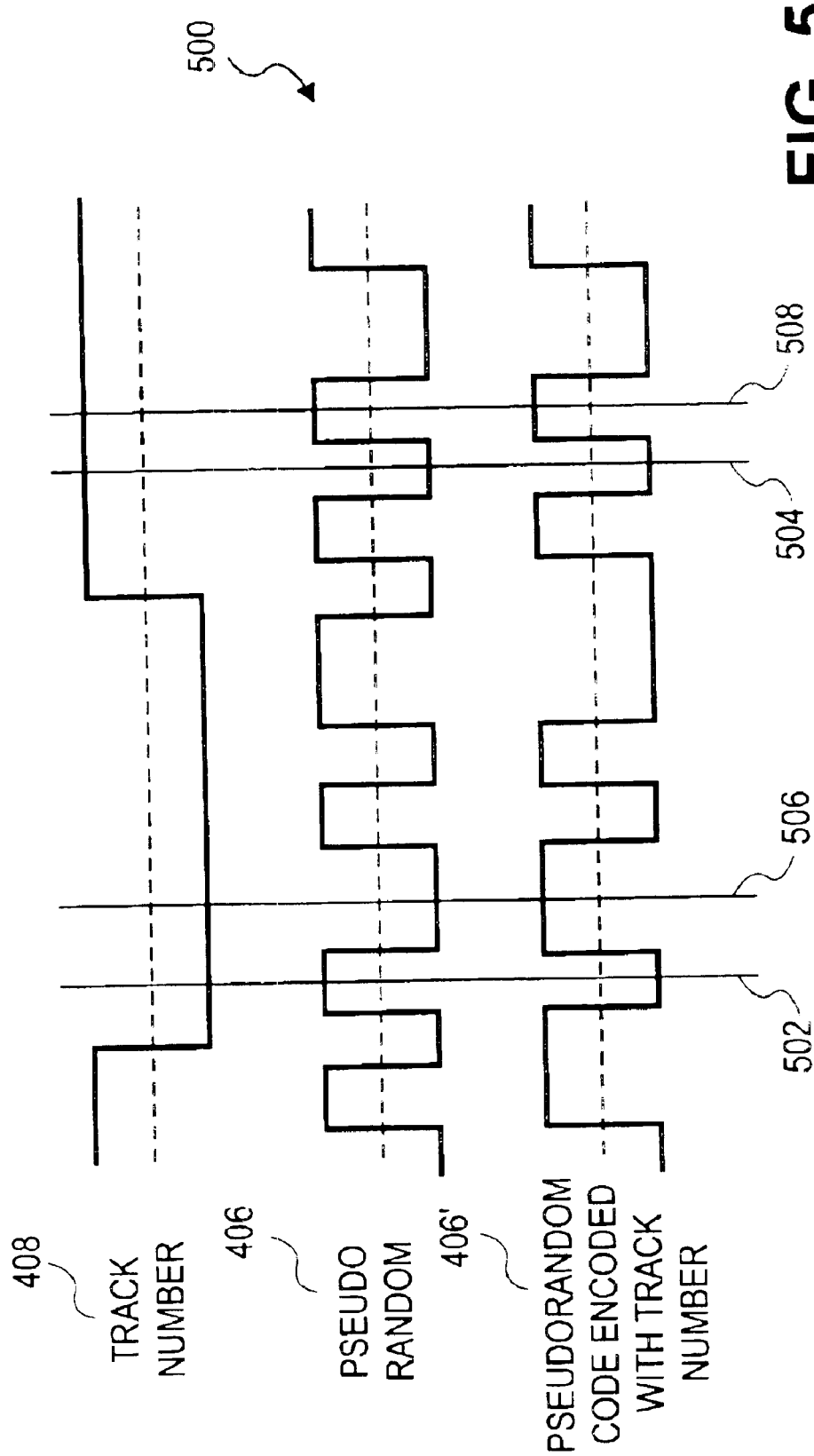
FIG. 5 is an example signal chart of a track number, a pseudorandom code, and the pseudorandom code encoded with the track number, according to an embodiment of the invention.

FIG. 5 shows an example signal chart 500 of the track number 408, the pseudorandom code 406, add the pseudorandom code 406' as encoded with the track number 408, according to an embodiment of the invention. When either the track number 408 or the pseudorandom code 406 is high, the resulting pseudorandom code 406' is low, examples of which are indicated at the vertical lines 502 and 504. When the track number 408 and the pseudorandom code 406 are both high or are both low, the resulting pseudorandom code 406' is high, examples of which are indicated at the vertical lines 506 and 508. Encoding approaches other than that depicted in FIG. 5 are also possible. In the resulting pseudorandom code 406', a high signal indicates that a mark is written to an appropriate track on the label side of an optical disc, whereas a low signal indicates that a mark is not written to the track.

Figure 6:
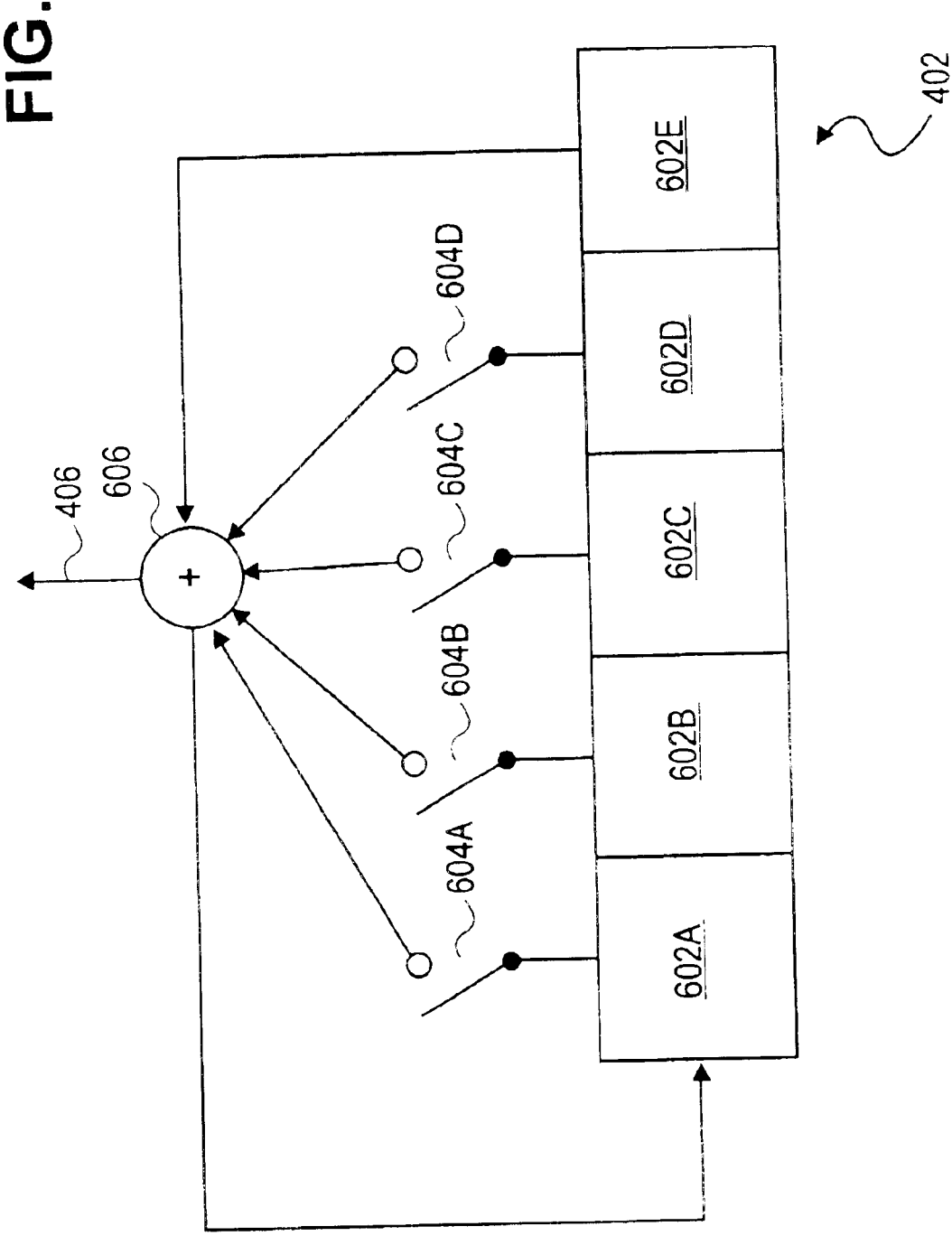
FIG. 6 is a diagram of an n-stage shift register generator, according to an embodiment of the invention.

FIG. 6 shows in detail the pseudorandom code generator 402, according to an embodiment of the invention. The code generator 402 in FIG. 6 is a five-stage shift register generator, because it has five shift registers 602A, 602B, 602C, 602D, and 602E, collectively referred to as the shift registers 602. More generally, the code generator 402 in FIG. 6 is an n-stage shift register generator. The code generator 402 also has a feedback adder 606, the output of which is the pseudorandom code 406 on a bit-by-bit basis.

Each of the first four shift registers 602A, 602B, 602C, and 602D can be connected, or "tapped," to the feedback adder 606, by closing the switches 604A, 604B, 604C, and 604D, respectively. In the embodiment of FIG. 6, the fifth shift register 602E is always connected to the feedback adder 606, such that the shift register 602E is; always tapped in this embodiment. The code generator 402 is said to have feedback "taps" corresponding to the shift registers 602 that are connected to the feedback adder 606. For instance, if the registers 602A, 602B, and 602E are connected to the adder 606, then the generator 402 has taps at the first, second, and fifth registers. The taps of the code generator 402 determine the pseudorandom code 406 that is generated.

In one embodiment, the code generator 402 has two taps at the second and at the fifth registers, indicated by the nomenclature [5, 2], whereas in another embodiment, the code generator 402 has four taps at the second, third, fourth, and fifth registers, indicated by the nomenclature [5, 4, 3, 2]. In a third embodiment, the code generator 402 has four taps at the first, second, fourth, and fifth registers, indicated by the nomenclature [5, 4, 2, 1]. Within each of these embodiments, the pseudorandom code 406 is generated as a maximal spread spectrum code having a maximal code length of $2^5-1$, or 31, bits. Other embodiments of the invention may employ different feedback taps, such that more generally the n-stage shift register generator has m taps.

The embodiment having the feedback taps [5, 2] generates the following pseudorandom code sequence: 1111100110100100001010111011000. The embodiment having the feedback taps [5, 4, 3, 2] generates the following pseudorandom code sequence: 1111100100110000101101010001110. Finally, the embodiment having the feedback taps [5, 4, 2, 1] generates the following pseudorandom code sequence: 1111101100111000011010100100010.

Figure 7:
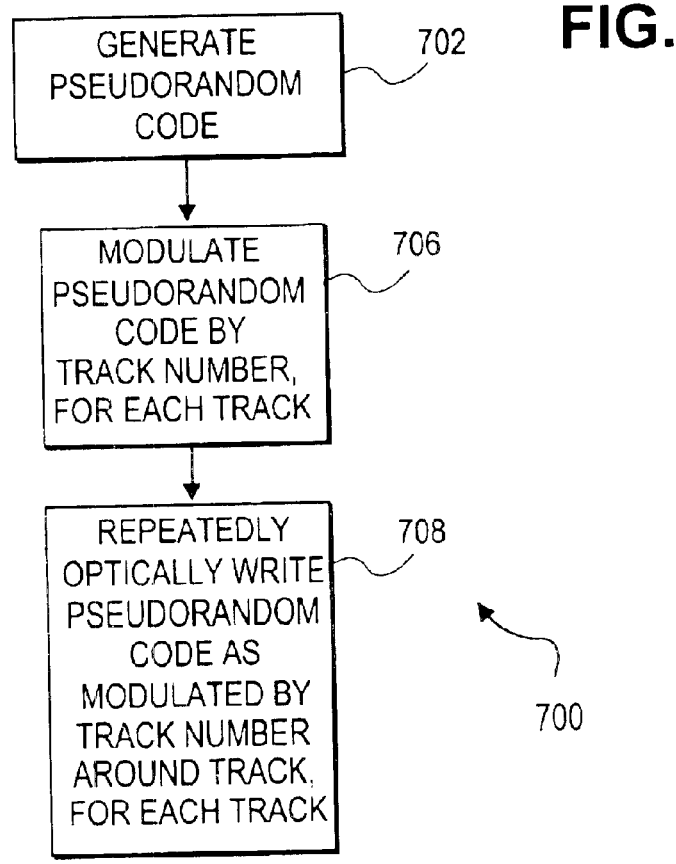
FIG. 7 is a flowchart of a method for encoding the numbers of the tracks of an optical disc within at least one of the repeating pseudorandom series of marks that are written on the tracks, according to an embodiment of the invention.

FIG. 7 shows a method 700 for encoding track numbers within a pseudorandom code and writing the pseudorandom code on the optically writable label side of an optical disc, according to an embodiment of the invention. The pseudorandom code is generated (702). For instance, the pseudorandom code may be generated as a maximal spread spectrum code as has been described. The pseudorandom code is modulated, or multiplied, by the track number on a bit-by-bit basis, for each track (706). 702 and 706 are preferably performed offline for an entire optical disc, before the optical disc is written in 708, and even before the optical disc has been manufactured.

For each track, the pseudorandom code as modulated with the track number is then optically written at least one time around the track, with the original pseudorandom code not encoded with track number optionally optically written repeatedly around the track as well (708). 708 is performed on a batch basis for an entire optical disc. For instance, 702 and 706 may result in a bitmap image for an optical disc, which is then printed onto the optical disc in an offset or other manner.

The pseudorandom code may be optically written as a series of optically written marks, where logical one bits correspond to marks being written on the track, and logical zero bits correspond to marks not being written on the track. As is described in a subsequent section of the detailed description, where a digital approach has been used to encode the track number within the pseudorandom code, the code as modulated by the track number is preferably repeated fewer times, and as few as one time, around the track as compared to the original code not modulated by the track number. Conversely, where an analog approach has been used to encode the track number within the pseudorandom code, the code as modulated by the track number is preferably completely repeated around the track, and the original code not modulated by the track number is wholly absent.

Decoding Track Number from Pseudorandom Code

Figure 8:
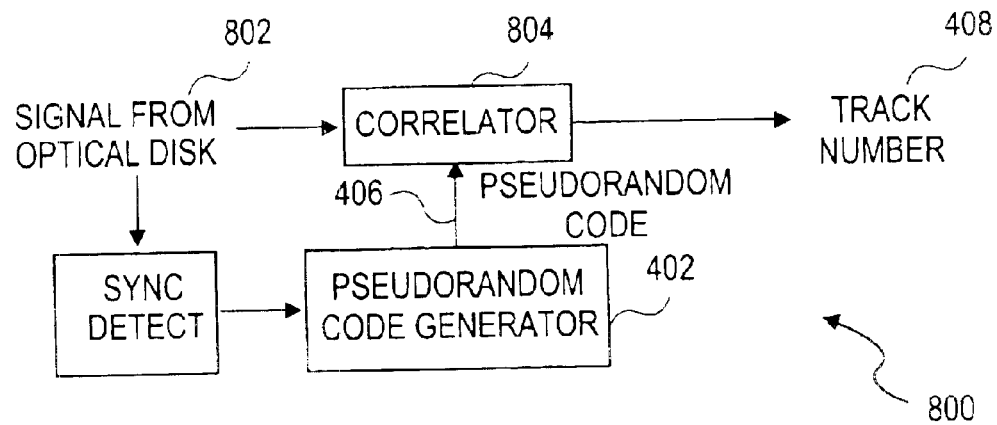
FIG. 8 is a block diagram of a spread spectrum decoding approach, according to an embodiment of the invention.

FIG. 8 shows a decoding approach 800 for decoding the track number 408 from the optical disc signal 802, according to an embodiment of the invention. The pseudorandom code 406 is again preferably a maximal spread spectrum code, such that the decoding approach 800 is consistent with a spread spectrum decoding approach. The signal 802 from the optically writable label side of an optical disc is input into a correlator 804. The correlator 804 correlates the pseudorandom code as encoded with the track number 408. The sync detect 401 synchronizes the pseudorandom code generated with that on the signal 802.

For instance, the correlator 804 may autocorrelate the pseudorandom code from any phase-shifted replicated version thereof present in the signal 802. This is because the signal 802 may reflect the current pseudorandom code being read, as well as parts of the code as repeated on the same track. The correlator 804 may also crosscorrelate the pseudorandom code as modulated by the track number 408 from any other pseudorandom code as modulated by any other track number that is present in the signal 802. This is because the signal 802 may reflect the pseudorandom code for the current track, as well as parts of pseudorandom codes from adjacent and other tracks. The correlator 804 may be hardware, software, or a combination of hardware and software. In one embodiment, the correlator 804 may be a sliding frame correlator, as known to those of ordinary skill within the art, to synchronize the pseudorandom code from the signal 802 with the pseudorandom code 406 generated by the code generator 402.

In one embodiment, the code generator 402 may be present in two different devices: the host computing device that generates the pseudorandom code during manufacturing of the optical disc, and the printing system or mass storage device that then reads the optical disc within an end user environment. In the former case, the generator 402 can be implemented within software. In the latter case, the generator 1402 can be implemented within digital logic of the device, or within software.

The pseudorandom code as encoded with the track number 408 is input into the correlator 804 on a bit-by-bit basis.

The pseudorandom code 406 generated by the pseudorandom code generator 402, as has been described in the previous section of the detailed description, is also input into the correlator 804 on a bit-by-bit basis. The correlator 804, by modulating or multiplying the pseudorandom code encoded with the track number as read from the optical disc signal 802 with the pseudorandom code 406, effectively demodulates or decodes the track number 408. Thus, the decoding approach 800 of FIG. 8 has the same methodology as the encoding approach 400 of FIG. 4, and utilizes the same pseudorandom code 406 that is utilized in the encoding approach 400.

Figure 9:
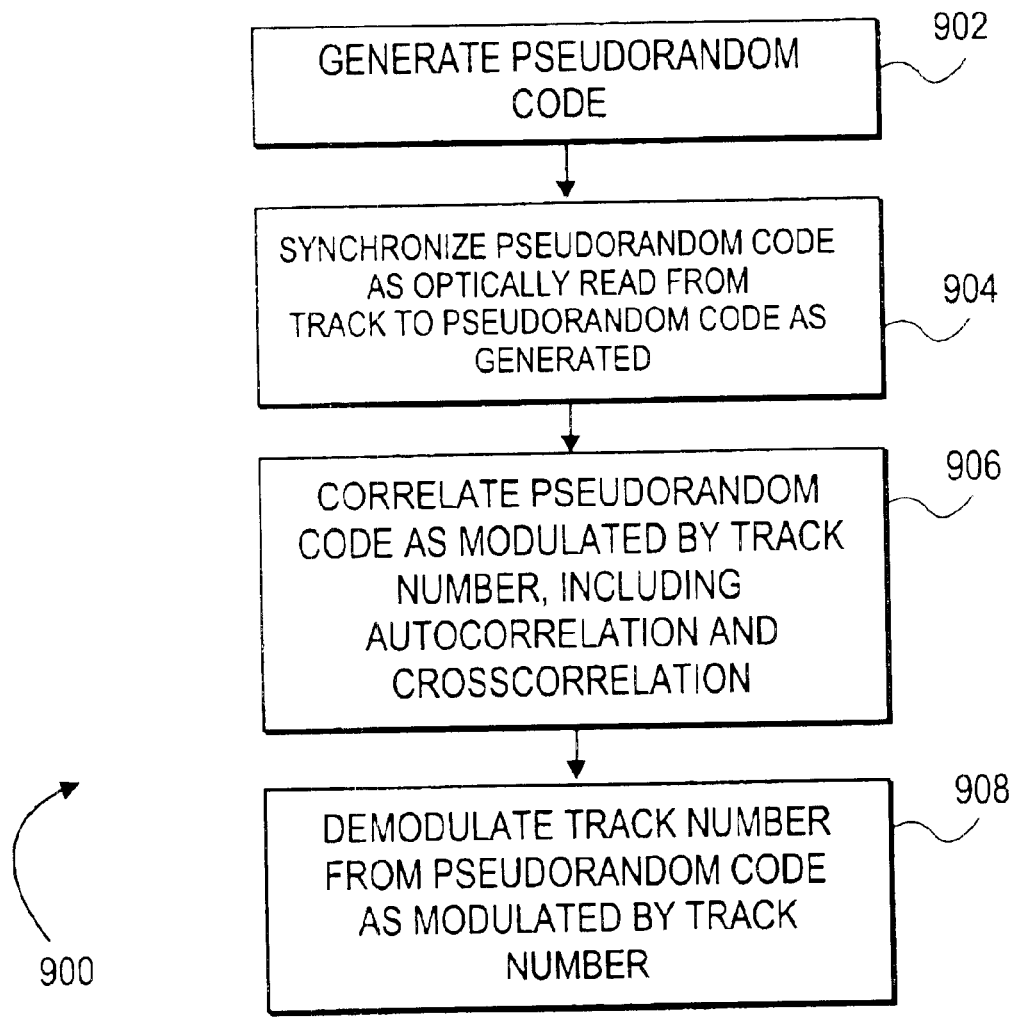
FIG. 9 is a flowchart of a method for decoding the numbers of the tracks of an optical disc from repeating pseudorandom series of marks written on the tracks, according to an embodiment of the invention.

FIG. 9 shows a method 900 for decoding the track number encoded within a pseudorandom code that is read from an optically readable label side of an optical disc, according to an embodiment of the invention. First, the pseudorandom code with which the track number was modulated is generated (902). Preferably, this pseudorandom code is synchronized with a pseudorandom code as optically read from the optically readable side of the optical disc (904). The pseudorandom code as modulated by the track number, as optically read from the optically readable side of the optical disc, is correlated, including autocorrelation and crosscorrelation as necessary (906), and the track number is demodulated from the pseudorandom code as modulated by the track number (908). For instance, the pseudorandom code as modulated by the track number may be multiplied on a bit-by-bit basis with the pseudorandom code as generated.

Digital (Binary) Approach Versus Analog (Gray-Scale) Approach

The encoding approach that has been substantially described thus far in the detailed description is a digital, or binary, encoding approach, in which the pseudorandom code 406, the track number 408, and the pseudorandom code 406' each have at any given time a high value or a low value. As a result, the pseudorandom code 406' encoded with the track number 408 may not resemble the pseudorandom code 406, which is not encoded with the track number 408, as is apparent, for instance, from FIG. 5. Multiplying the pseudorandom code 406 by the track number 408 to yield the pseudorandom code 406' may thus result in the code 406' not being readily detected as a version of the pseudorandom code 406, since each bit of the track number 408 can potentially cause a complete change in the corresponding bit of the pseudorandom code 406 when modulated by the track number 408 to yield the pseudorandom code 406'.

This means that the pseudorandom code 406' is preferably repeated around the track of an optical disc fewer times, and as little as one time, as compared to the pseudorandom code 406. The decoding process, as has been described, therefore initially synchronizes to the pseudorandom code 406 repeated around the track, which is known a priori, and then decodes the track number 408 from the subsequently read pseudorandom code 406'. A high bit of the pseudorandom code 406 or 406' may be written to the optically writable label side of an optical disc as the presence of a mark thereon, whereas a low bit of the code 406 or 406' may be written as the absence of a mark thereon.

Alternatively, the encoding approach may be an analog, or gray-scale, encoding approach, in which the track number 408 only relatively slightly affects the amplitude of the pseudorandom code 406 when the latter is modulated by the former to result in the pseudorandom code 406'. For instance, the pseudorandom code 406 may have an initial amplitude of 0.1 or 1.0, corresponding to a zero or one bit of the code 406, respectively. Modulating the pseudorandom code 406 by the track number 408 may result in increasing or decreasing the amplitude by 0.1, depending on whether the bit of the track number 408 is a one or a zero. For example, if the code 406 has a low bit, and is modulated by the track number 408 having a high bit, the resulting bit of the code 406' is 0.1+0.1, or 0.2.

Therefore, in an analog encoding approach, the pseudorandom code 406' may have for each bit thereof a value of 0.0, 0.2, 0.9, or 1.1. The former two values correspond to the original bit of the pseudorandom code 406 being 0.1, whereas the latter two values correspond to the original bit of the pseudorandom code 406 being 1.0. Of the values 0.0 and 0.2, the value 0.0 represents an original low bit thereof the pseudorandom code 406 being modulated by a low bit of the track number 408, whereas the value 0.2 represents an original low bit of the code 406 being modulated by a high bit of the track number 408. Similarly, the value 0.9 represents an original high bit of the code 406 being modulated by a low bit of the track number 408, whereas the value 1.1 represents an original high bit of the code 406 being modulated by a high bit of the track number 408.

The original pseudorandom code 406 is thus easily discerned from the pseudorandom code 406' within which the track number 408 is encoded. The pseudorandom code 406' may therefore be repeated around the track of an optical disc without any repetitions of the pseudorandom code 406. This is because synchronization of the a priori known pseudorandom code 406 can be accomplished even to the pseudorandom code 406', unlike in the digital approach, for instance.

Achieving gray scale when writing the pseudorandom code 406' to the optically writable label side of the optical disc can be accomplished in a number of different ways. The size of a mark on the label side may be varied, such that different sizes correspond to different values of the pseudorandom code 406'. Alternatively, a mark may be written with an intensity or dye amount that varies according to the different values of the pseudorandom code 406'. In another embodiment, dye loading can be used to obtain four different values of the pseudorandom code 406'. Dye loading is defined as the amount of dye in a particular ink. Dye loading changes can be used to create inks with different optical densities. For example, there may be two inks, ink A and ink B, one with twice the optical density of the other. Marking is then accomplished in two passes, with none, only ink A only ink B, or both inks A and B at a particular position. This provides for four gray levels at the maximum spatial resolution of the media. Other multiple-dye and phase-change approaches may also be utilized. Furthermore, a matrix of binary marks can also be employed to achieve gray scale, comparable, for instance, to half-toning. In addition, in one embodiment, the marks may be written such that they are visible only under a non-visible light, such as an infrared (IR) light, so that end users cannot easily discern them.

Mass Storage Device

Figure 10:
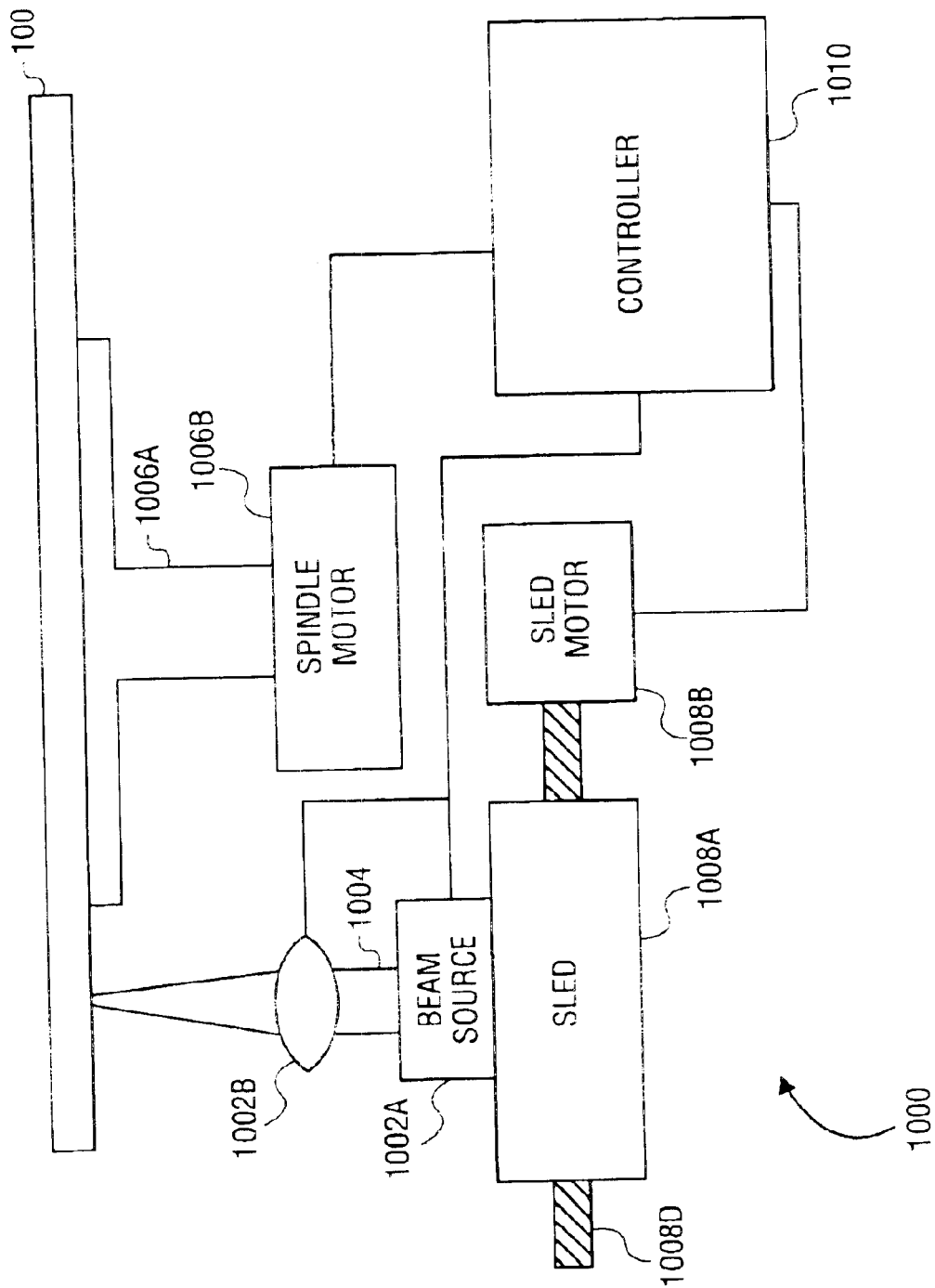
FIG. 10 is a diagram of a mass-storage device, according to an embodiment of the invention.

FIG. 10 shows a mass storage device 1000, according to an embodiment of the invention. The mass storage device 1000 is for reading from and/or writing to the optical disc 100. More specifically, the mass storage device 1000 is for reading from and/or writing to an optically writable data surface of the optical disc 100, and/or an optically writable label surface of the optical disc 100. The mass storage device 1000 includes a beam source 1002A and an objective lens 1002B, which are collectively referred to as the optical marking mechanism 1002, or the optical pickup unit (OPU). The storage device 1000 also includes a spindle 1006A and a spindle motor 1006B, which are collectively referred to as the first motor mechanism 1006. The device 1000 includes a sled 1008A and a sled motor 1008B, and a rail 1008D, which are collectively referred to as the second motor mechanism 1008. Finally, the mass storage device 1000 includes a controller 1010, which may more generally be referred to as a mechanism.

The optical marking mechanism 1002 focuses an optical beam 1004 on the optical disc 100. Specifically, the beam source 1002A generates the optical beam 1004, which is focused through the objective lens 1002B onto the optical disc 100. Position information is returned from the optical marking mechanism 1002 and/or provided by the controller 1010. That is, the position information is provided based on the track information decoded from the pseudorandom series of markings on the optical disc 100, and/or from the pseudorandom series of marks themselves without regard to any track information that may be encoded therein.

The first motor mechanism 1006 rotates the optical disc 100. Specifically, the optical disc 100 is situated on the spindle 1006A, which is rotated, or moved, by the spindle motor 1006B, based upon the position information from the optical marking mechanism 1002 and/or from the controller 1010. A rotary encoder may alternatively be present to specify a position to the spindle motor 1006B. The rotary encoder may include hardware, software, or a combination of hardware and software. Furthermore, the spindle motor 1006B may include a sensor, such as a Hall effect sensor.

The second motor mechanism 1008 moves the optical marking mechanism 1002 radially relative to the optical disc 100, also based upon the position information from the optical marking mechanism and/or from the controller 1010. Specifically, the optical marking mechanism 1002 is situated on the sled 1008A, which is moved on the rail 1008D by the sled motor 1008B. A linear encoder may alternatively be present to specify a position to the sled motor 1008B. The linear encoder may include hardware, software, or a combination of hardware and software.

The controller 1010 thus selects positions on the optical disc 100 at which the optical beam 1004 is to be focused for optically writing to and/or optically reading from such positions, by controlling the optical marking mechanism 1002 as well as the first motor mechanism 1006 and the second motor mechanism 1008. The optical marking mechanism 1002 is able to control the beam 1004 generated by the beam source 1002A, the focusing of the beam 1004 through the objective lens 1002B, the spindle motor 1006B, and the sled motor 1008B. The controller 1010 may include hardware, software, or a combination of hardware and software.

The controller 1010 further is for optically reading a pseudorandom code, the pseudorandom code encoded with the number of a track of the optical disc 100, and for decoding the number of the track therefrom to determine the track number, as has been described. As such, the controller 1010 may include the pseudorandom code generator 402 that has been described to generate the pseudorandom code. The controller 1010 may also include the modulator 404 and/or the correlator 804 as have been described.

The pseudorandom code as may be encoded with the number of a track is thus initially detected as a signal of a pseudorandom series of markings by the optical marking mechanism 1002. The optical marking mechanism 1002 also may pick up some of the pseudorandom marking series of adjacent tracks as well, which the correlator 804 rejects during crosscorrelation. Furthermore, by estimating the proportion of the signal that is being picked up from the track below or from adjacent tracks, the controller 1010 can estimate the location of the focal point of the beam 1104 to a sub-track resolution. This track location information can then be used to control the motor mechanism 1006 and/or the motor mechanism 1008 and to provide instantaneous feedback information.

In addition, the pseudorandom code generator 402 is time aligned with the signal of the pseudorandom series of markings that is read by the optical marking mechanism 1002. This time information can be subdivided to allow for fractional mark resolution for angular optical disc positioning. Furthermore, this time information can also be used to control the speed of rotation of the optical disc 100, and provide instantaneous feedback information. As can be appreciated by those of ordinary skill within the art, the components depicted in the mass storage device 1000 are representative of one embodiment of the invention, and do not limit all embodiments of the invention. Other control approaches can also be employed. As only one example, the sled 1008A may be positioned with the sled motor 1008B, with finer adjustment obtained using a voice coil attached to the beam source 1002A and/or the objective lens 1002B.

Figure 11:
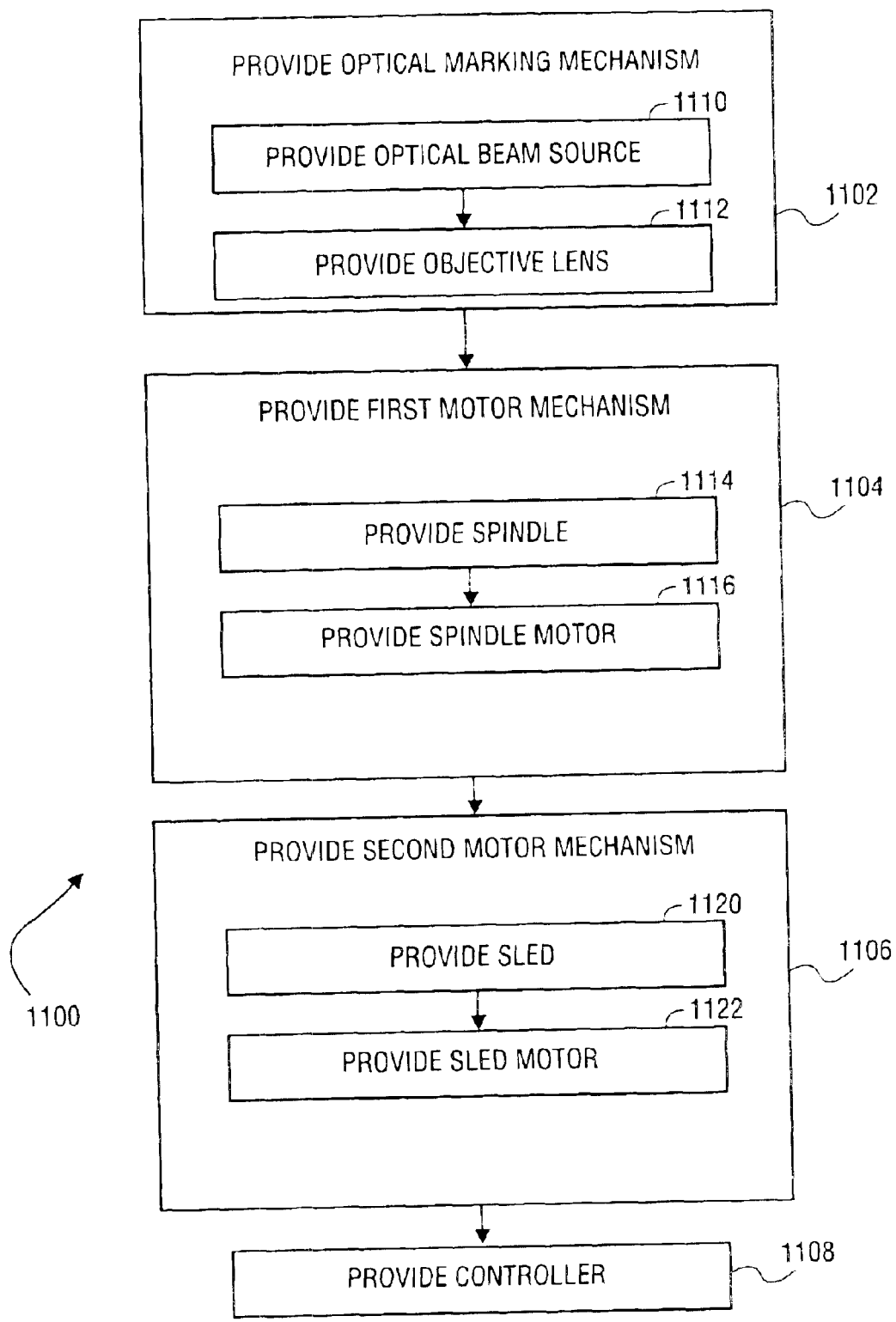
FIG. 11 is a flowchart of a method of manufacture of a mass-storage device, according to an embodiment of the invention.

FIG. 11 shows a method of manufacture 1100 for the mass storage device 1000 of FIG. 10, according to an embodiment of the invention. The method 1100 includes providing the optical marking mechanism 1002 (1102), providing the first motor mechanism 1006 (1104), providing the second motor mechanism 1008 (1106), and providing the controller 1010 (1108). In one embodiment, providing the optical marking mechanism 1002 includes providing the optical beam source 1002A (1110) and the objective lens 1002B (1112), whereas providing the first motor mechanism 1006 in one embodiment includes providing the spindle 1006A (1114) and the spindle motor 1006B (1116). Finally, providing the second motor mechanism 1008 in one embodiment includes providing the sled 1008A (1120) and the sled motor 1008B (1122).

Alternative Embodiments and Conclusion

Embodiments of the invention have thus far been substantially described in relation to an article of manufacture that is a rotatable optical disc having an optically readable side. However, other embodiments of the invention are more generally applicable to any type of article of manufacture that includes a surface on which optically readable marks are writable and on which one or more optically readable position-indicating pseudorandom marks have been written. That is, the track information that has been described as being encoded within pseudorandom marks is more generally position information encoded within the pseudorandom marks. Such surfaces may have one-dimensional and/or two-dimensional bar codes written on them, as well as other types of optically readable markings. In other embodiments of the invention, the position information may indicate the locations of the pseudorandom marks as written to surfaces of articles of manufacture. The position information may, for instance, include the x and y coordinates of the locations of the pseudorandom marks on the surface. The surface may be paper or another type of media that has a rectangular or other shape, and that is flat, curved, and so on.

Other embodiments of the invention thus may be more general than the specific embodiments of the invention that have been described in relation to a rotatable optical disc having an optically readable side. The methods and devices that have been described, for instance, may more generally apply to any type of article of manufacture that includes a surface on which optically readable position-indicating pseudorandom marks have been written. For instance, a pseudorandom code may be generated, modulated by position information on an optically readable surface, and then written to the surface at the location indicated by the position information. As another example, a pseudorandom code modulated by the position information of the location of the code may be optically read from an optically readable surface, and the position information demodulated therefrom. A device may include an optical marking mechanism that is able to optically read markings from an optically readable surface, and a mechanism to optically read from the surface a pseudorandom code encoded with position information of the location of the code and to decode the position information.

Therefore, it is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. An optical disc comprising:
    an optically writable label side on which marks are optically writable; and,
    a plurality of tracks on the optically writable label side,
    each track having written thereto a repeating pseudorandom series of marks.

2. The optical disc of claim 1, wherein at least one of the repeating pseudorandom series of marks of each track has a number of the track encoded therein.

3. The optical disc of claim 2, wherein the number of each track is digitally encoded within the at least one of the pseudorandom series of marks of the track.

4. The optical disc of claim 2, wherein the number of each track is encoded in an analog manner within the at least one of the pseudorandom series of marks of the track.

5. The optical disc of claim 1, wherein the marks that are optically writable on the optically writable label side are written in accordance with at least one of a phase-change, multiple-dye, and a multiple-dye phase-change approach.

6. The optical disc of claim 1, wherein the marks that are optically writable on the optically writable label side are written using a first dye, and the repeating pseudorandom series of marks on each track are written using a second dye different than the first dye.

7. The optical disc of claim 1 wherein the marks that are optically writable on the optically writable label side are written using a dye at a first amount for each mark having a first reflectivity, and the repeating pseudorandom series of marks on each track are written using the dye at a second amount for each mark different than the first amount and having a second reflectivity different than the first reflectivity.

8. The optical disc of claim 1, wherein the repeating pseudorandom series of marks is a maximal spread spectrum code.

9. The optical disc of claim 8, wherein the repeating pseudorandom series of marks has a maximal code length and is generated with an n-stage shift register generator having m number of taps.

10. The optical disc of claim 9, wherein the maximal code length of the repeating random series of marks is 31, and the repeating random series of marks is generated with a five-stage shift register generator.

11. The optical disc of claim 10, wherein five-stage shift register generator has two taps located at a second stage and at a fifth stage of the generator.

12. The optical disc of claim 10, wherein five-stage shift register generator has four taps located at a second stage, at a third stage, at a fourth stage, and at a fifth stage of the generator.

13. The optical disc of claim 10, wherein five-stage shift register generator has four taps located at a first stage, at a second stage, at a fourth stage, and at a fifth stage of the generator.

14. An optical disc comprising:
    an optically writable label side on which marks are optically writable;
    a plurality of tracks on the optically writable label side; and,
    means for pseudorandomly encoding a number of each track on the track.

15. The optical disc of claim 14, where the means comprises a maximal spread spectrum code encoding the number of each track on the track.

16. A method comprising:
    generating a pseudorandom code;
    for each track of a plurality of tracks on an optically writable label side of an optical disc;
    modulating the pseudorandom code by a number of the track; and,
    writing the pseudorandom code as modulated by the number of the track around the track.

17. The method of claim 16, wherein generating the pseudorandom code comprises generating a maximal spread spectrum code.

18. The method of claim 16, wherein generating the pseudorandom code utilizing an n-stage shift register generator having m number of taps.

19. The method of claim 16, wherein modulating the pseudorandom code by the number of the track comprises multiplying the pseudorandom code by the number of the track.

20. The method of claim 16, wherein writing the pseudorandom code as modulated by the number of the track comprises writing the pseudorandom code as modulated by the number of the track with a dye particular to track number writing.

21. The method of claim 16, wherein writing the pseudorandom code as modulated by the number of the track comprises writing the pseudorandom code as modulated by the number of the track with a dye amount particular to track number writing.

22. A method comprising:
    optically reading from a track on an optically readable label side of an optical disc a pseudorandom code as modulated by a number of the track; and,
    demodulating the number of the track from the pseudorandom code as modulated by the number of the track to obtain the number of the track.

23. The method of claim 22, further comprising correlating the pseudorandom code as modulated by the number of the track.

24. The method of claim 22, wherein correlating the pseudorandom code as modulated by the number of the track comprises:
    autocorrelating the pseudorandom code as modulated by the number of the track from any phase-shifted replicated version thereof; and,
    crosscorrelating the pseudorandom as modulated by the number of the track from any pseudorandom code as modulated by a number of a different track.

25. The method of claim 22, further comprising generating the pseudorandom code.

26. The method of claim 25, wherein demodulating the number of the track from the pseudorandom code as modulated by the number of the track comprises multiplying the pseudorandom code as modulated by the number of the track with the pseudorandom code as generated.

27. A mass storage device:
- an optical marking mechanism to at least optically read markings on a plurality of tracks of an optically readable label side of an optical disc, each track having a pseudorandom code encoded with a number of the track; and,
- a mechanism to optically read the pseudorandom code encoded with a number of a track and decode the number of the track therefrom to determine the number of the track.

28. The mass storage device of claim 27, wherein the mechanism comprises an n-stage shift register generator having m number of taps to generate the pseudorandom code as a maximal spread spectrum code having a maximal code length.

29. The mass storage device of claim 28, wherein the n-stage shift register generator has a tap on each of a plurality of stages of the shift register generator.

30. The mass storage device of claim 28, wherein the mechanism further comprises a correlator to correlate the pseudorandom code as encoded with the number of the track.

31. The mass storage device of claim 30, wherein the correlator is a sliding frame correlator.

32. A mass storage device:
- an optical marking mechanism to at least optically read markings on a plurality of tracks of an optically readable label side of an optical disc, each track having a pseudorandom code as encoded with a number of the track; and,
- means for determining a number of a track by optically reading the pseudorandom code as encoded with the number of the track and decoding the number of the track therefrom.

33. The mass storage device of claim 32, wherein the means comprises:
- an n-stage shift register generator having m number of taps to generate the pseudorandom code as a maximal spread spectrum code having a maximal code length; and,
- a correlator to correlate the pseudorandom code as encoded with the number of the track.

34. A method comprising:
- providing an optical marking mechanism of a mass storage device that is capable of at least optically reading markings on a plurality of tracks of an optically readable label side of an optical disc inserted into the mass storage mechanism, each track having a pseudorandom code as encoded with a number of the track; and,
- providing a mechanism capable of optically reading the pseudorandom code encoded with a number of a track and capable of decoding the number of the track therefrom to determine the number of the track.

35. The method of claim 34, wherein providing the mechanism comprises providing an n-stage shift register generator having m number of taps to generate the pseudorandom code as a maximal spread shift code having a maximal code length.

36. The method of claim 35, wherein providing the mechanism comprises providing a correlator capable of correlating the pseudorandom code as encoded with the number of the track.

37. An article of manufacture comprising:
- a surface on which optically readable marks are writable; and,
- one or more optically readable position-indicating pseudorandom marks written on the surface.

38. The article of claim 37, wherein each pseudorandom mark has encoded therein position information of the mark on the surface.

39. The article of claim 38, wherein the position information of each pseudorandom mark comprises an x coordinate and a y coordinate of a location of the mark on the surface.

40. The article of claim 38, wherein the position information of each pseudorandom mark on the surface is digitally encoded within the mark.

41. The article of claim 38, wherein the position information of each pseudorandom mark on the, surface is encoded in an analog manner within the mark.

42. The article of claim 37, wherein the one or more pseudorandom marks is a maximal spread spectrum code.

43. A method comprising:
- generating a pseudorandom code;
- modulating the pseudorandom code by position information on an optically readable surface; and,
- writing the pseudorandom code on the surface.

44. The method of claim 43, wherein generating the pseudorandom code comprises generating a maximal spread spectrum code.

45. A method comprising:
- optically reading from an optically readable surface a pseudorandom code modulated by position information of the pseudorandom code; and,
- demodulating the position information from the pseudorandom code to obtain the position information.

46. The method of claim 45, further comprising generating the pseudorandom code.

47. A device comprising:
- an optical marking mechanism to at least optically read markings from an optically readable surface; and,
- a mechanism to optically read a pseudorandom code encoded with position information of the pseudorandom code from the optically readable surface and to decode the position information therefrom to determine the position information.

48. The device of claim 47, wherein the mechanism comprises an n-stage shift register generator having m number of taps to generate the pseudorandom code as a maximal spread spectrum code having a maximal code length.

* * * * *